United States Patent
Huggins

(10) Patent No.: US 6,224,305 B1
(45) Date of Patent: May 1, 2001

(54) ELECTRONIC LEVER FOR REMOTELY ACTUATING A CHUCK DEVICE

(75) Inventor: Mark S. Huggins, Clemson, SC (US)

(73) Assignee: Power Tool Holders, Incorporated, Christiana, DE (US)

( * ) Notice: Subject to any disclaimer, the term of this patent is extended or adjusted under 35 U.S.C. 154(b) by 0 days.

(21) Appl. No.: 09/669,437

(22) Filed: Sep. 25, 2000

Related U.S. Application Data

(63) Continuation of application No. 09/196,795, filed on Nov. 20, 1998, now abandoned.

(51) Int. Cl.[7] .................................................. B23C 1/20
(52) U.S. Cl. ................ 409/182; 144/136.95; 144/154.5; 279/50; 279/134
(58) Field of Search ............................... 409/182, 43, 50, 409/57, 74, 75, 134, 135; 144/136.95, 371, 154.5

(56) References Cited

U.S. PATENT DOCUMENTS

| | | | | |
|---|---|---|---|---|
| 1,364,783 | * | 1/1921 | Morgan ................................. | 279/135 |
| 2,562,143 | * | 7/1951 | Godfrey et al. ...................... | 409/182 |
| 4,080,716 | * | 3/1978 | vom Dorp ................................ | 279/4 |
| 4,729,701 | * | 3/1988 | Chaur-Sheng ........................ | 409/233 |
| 4,819,320 | * | 4/1989 | Cairns et al. ......................... | 409/232 |
| 5,921,730 | * | 7/1999 | Young et al. .......................... | 409/182 |
| 5,970,599 | * | 10/1999 | Garnett et al. ........................ | 409/164 |
| 5,997,225 | * | 12/1999 | Young et al. .......................... | 409/182 |
| 6,045,306 | * | 4/2000 | Buddendeck et al. ................ | 409/182 |
| 6,079,916 | * | 6/2000 | Grayson et al. ...................... | 409/182 |
| 6,079,917 | * | 6/2000 | Miksa et al. .......................... | 409/182 |
| 6,079,918 | * | 6/2000 | Buddendeck et al. ................ | 409/182 |

\* cited by examiner

*Primary Examiner*—A. L. Wellington
*Assistant Examiner*—Erica D. Ergenbright
(74) *Attorney, Agent, or Firm*—Nelson Mullins Riley & Scarborough

(57) ABSTRACT

A rotary power tool is provided having a remotely actuated chuck device. The chuck is mounted onto the end of a drive spindle that extends from the casing of the power tool. The chuck includes an outer sleeve member that is axially movable relative to the drive spindle between a gripping and release position. A chuck actuating device is provided having a first member engaged with the outer sleeve member and which extends generally radially outward from the drive spindle or chuck. The first member is movable in a direction so as to move the outer sleeve member between the gripping position and release position. A solenoid and a biasing mechanism engage the first member so that the chuck device is movable between the gripping and release positions.

21 Claims, 4 Drawing Sheets

ELECTRONIC LEVER FOR REMOTELY ACTUATING A CHUCK DEVICE

This application is a continuation of U.S. Patent application Ser. No. 09/196,795, filed Nov. 20, 1998, now abandoned.

BACKGROUND OF THE INVENTION

The present invention relates to a rotary power tool, particularly a router, having a chuck device for holding a tool bit to a drive spindle wherein the chuck device is remotely actuated.

There are a number of well known types of power tools, including routers, wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 5,810,366. Additional examples of such chucks are illustrated in U.S. Pat. Nos. 4,692,073; 2,807,473 and 3,521,895. U.S. patent application Ser. No. 09/067,569 describes another type of sleeve actuated chuck.

In certain operating environments, particularly with high speed routers, there is limited space in the critical area of the chuck device and tool bit to actuate the chuck for removal or insertion of the tool bit and the operation of changing out the tool bits can be potentially dangerous. With many conventional tools, the chucks are actuated by an external mechanism, such as a wrench or other tool. There is, however, a trend in the industry to incorporate quick-change chucks with such tools, particularly routers, to eliminate the necessity of external tools for operating the chucks and to take advantage of the obvious benefits of the quick-change chucks. However, the operation of actuating these quick-change chucks may also be cumbersome and potentially dangerous, especially where the operator must insert his hands next to the cutting edges of the tool bit.

The present invention provides an apparatus for remotely actuating a quick-change chuck device on rotary power tools, particularly routers, in a safe and quick manner.

OBJECTS AND SUMMARY OF THE INVENTION

It is, therefore, a principle object of the present invention to provide a power rotary tool incorporating a mechanism for remotely actuating the chuck device.

An additional object of the present invention is to provide a mechanism for safely changing out tool bits in rotary power tools wherein the operator's hands are totally removed from the cutting area of the tool bits.

Still a further object of the present invention is to provide a mechanism for remotely actuating chucks on rotary power tools, particularly fixed base routers, so that actuation of the chuck is no longer limited by manual hand strength.

Additional objects and advantages of the invention will be set forth in part in the following description, or may be obvious from the description, or may be learned through practice of the invention.

In accordance with the object and purposes of the invention, a rotary power tool is provided having a remotely actuated chuck device mounted on the end of a rotatable drive spindle. The power tool includes a casing housing the drive spindle with an end of the spindle extending through the casing and coupled with the chuck device. A chuck actuating device is engaged with the chuck device.

The chuck device is movable between a gripping position when the chuck clamps upon a tool bit held within the chuck device and a release position when the chuck device releases a tool bit. The present invention is not limited to any particular type of chuck device and, in this regard, the internal working mechanism of the chuck device is not particularly important to the invention or necessary for an understanding of the invention. Similarly, the remote actuating device is not limited to any particular electrical arrangement. It is intended that the present invention be utilized with any chuck device which causes the chuck device to grip and release a tool.

The rotary power tool, according to the invention, contains a chuck device comprising an outer sleeve member which is axially movable between a gripping position and a release position where the chuck device releases a tool held therein. It also includes a sleeve actuating device having a first member that is engaged to the outer sleeve member of the chuck and which extends generally radially outward from the chuck. The first member is movable or pivotable in a direction so as to move the outer sleeve member of the chuck between the gripping position and the release positions. The sleeve actuating device includes an actuator member configured or coupled with the first member to move the first member upon an external force being applied to the actuator member. The external force is an electrical or magnetic force. In this manner, upon the external force being applied to the actuator member, the first member causes the chuck to move between the gripping and release positions. Thus, the operator can remotely actuate the chuck while being completely removed from the working area of the tool bit held by the chuck.

In a preferred embodiment, the actuating member is a solenoid device or other electric motive device. The solenoid is operably configured or coupled with the first member so that when activated, the solenoid device moves the chuck device from a first position to a second position, gripping or releasing the tool bit. A biasing mechanism may be incorporated to return the first member to the first position when the solenoid device is disengaged. In another embodiment, a second solenoid device returns the first member to a first position.

In a preferred embodiment of the invention, the solenoid device includes a solenoid that is connected to the first member through a solenoid armature, which is generally perpendicular to the first member and is movable in a plane of movement which is generally parallel to the drive spindle. Upon activation of the solenoid, the solenoid armature moves, operating the first member so that the chuck device clamps or releases the bit. When the solenoid is deactivated, a biasing mechanism would cause the solenoid armature, and thus the first member and chuck device, to return to the first position.

In another embodiment, a first solenoid would move the chuck device into a locking position. A second solenoid, upon de-energizing of the first solenoid and energizing the second solenoid, would move the chuck device into a release position. By placing the solenoids in operative positions so that selective engagement of one of the solenoids would actuate the chuck device, while engagement of the other would release the chuck device, the biasing mechanism could be removed.

It should be appreciated that the rotary power tool according to the invention can comprise any make or configuration of power tool, for example, drills, lathes, tapping machines, sanders, grinders etc. In a preferred and particularly useful embodiment of the invention, a power rotary tool comprises a router whereas the chuck device is specifically configured to hold a routing bit to the drive spindle of the router.

The remote actuating mechanism may be incorporated as a component of the power tool casing, or may be an after market retrofit item that can be easily installed on existing rotary power tools. In this embodiment, the mechanism may include a base member that is easily attachable to any manner of conventional rotary power tool.

Preferred embodiments of the present invention will now be discussed in detail with reference to the following figures.

DETAILED DESCRIPTION OF THE PREFERRED EMBODIMENTS

Figure 1:
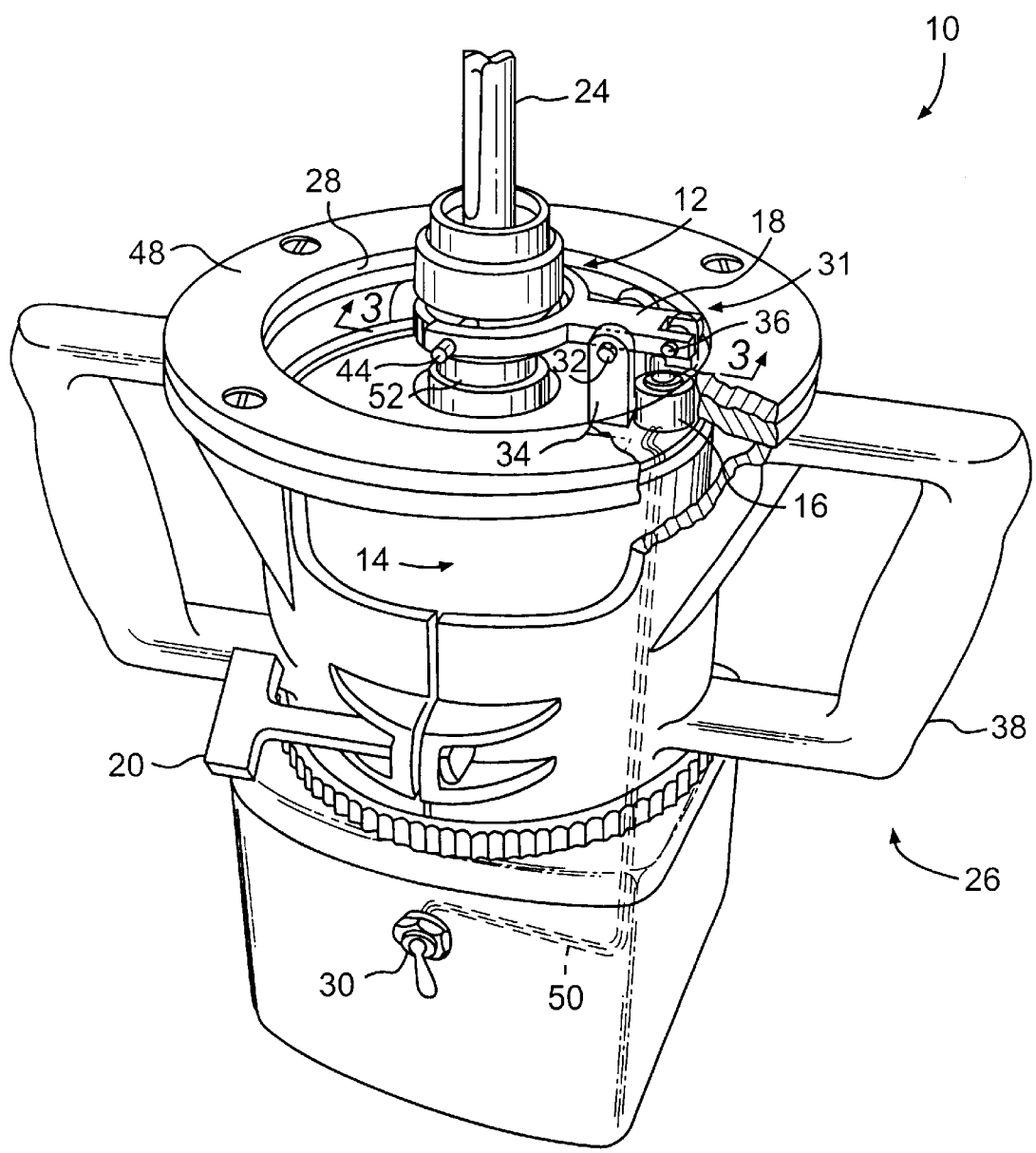
FIG. 1 is a perspective view of a router incorporating a sleeve actuating device according to the invention wherein one solenoid device actuates the chuck device.

Reference will now be made in detail to the presently preferred embodiments of the invention, one or more examples of which are illustrated in the drawings. Each example is provided by way of explanation of the invention, and is not meant as a limitation of the invention. For example, the features illustrated or described as part of one embodiment can be used on another embodiment to yield still a third embodiment. It is intended that the present invention include such modifications and variations as come within the scope and spirit of the present invention.

The present invention relates to power tools in general. For example, referring to the figures, the power tool 10 is illustrated as a conventional router. The particularly illustrated router is conventionally known as a fixed base router wherein a base member, shown generally as 26, is axially movable or positionable by rotating the base relative to a motor casing 14. This type of router is well known to those skilled in the art. Additional routers that are just as applicable (but not illustrated) include plunge type routers wherein the base member moves axially along guide rods or arms. This type of router is also well known to those skilled in the art. It should be appreciated that the present invention is not limited to any particular type of power tool, particularly any type of router. The invention has distinct advantages as it pertains to a fixed base router, as will be described in greater detail below, but this is not meant as a limitation of the invention. The present invention relates to any manner of power tool wherein it is desired to remotely actuate a chuck between gripping and release positions, including power drills, drill presses, lathes, milling machines, sanders, grinders, and the like.

Rotary power tool 10 according to the invention includes a chuck device, generally 12, for holding a tool bit 24. For example, in the embodiment of the power tool illustrated in the figures, chuck 12 holds a router bit 24. It should be appreciated that the type of chuck 12 is not particularly important to the invention. The present invention applies to any manner of chuck, for example the chucks described and illustrated in the patents and applications discussed above, wherein chuck 12 is actuated through axial movement relative to body member or drive spindle 52 of tool 10. For example, chuck 12 may be actuated by axial movement of an outer sleeve member 22 relative to the drive spindle. There are a number of sleeve actuated chuck devices known to those skilled in the art and the particular operation of chuck device 12 is not necessary for appreciation or understanding of the present invention. Thus, chuck 12 will not be described in detail herein. One particular type of chuck for which the present invention is particularly applicable is illustrated and described in U.S. Pat. No. 5,810,366 and U.S. patent application Ser. No. 09/067,569, both commonly owned by assignee Power Tool Holders Incorporated, the entire disclosures of which are incorporated herein by reference in their entirety for all purposes.

The chuck illustrated in the present figures is similar to the chuck illustrated and described in pending application Ser. No. 09/067,569. With this particular type of chuck, an axial bore is defined by a plurality of longitudinally extending gripping segments separated by axially extending slits. An axially movable sleeve member surrounds the gripping segments. The gripping segments are compressed radially inward upon axial movement of the sleeve member to a gripping position to grip upon a tool shank inserted into the bore. The tool is released when the gripping segments move to a release position upon opposite axial movement of the sleeve.

A chuck 12 useful in the present invention includes some structure or mechanism, such as sleeve 22, having a circumferential groove 42 or ridge defined therein, for engagement with a first member 18. Circumferential groove 42 may be formed as an integral component of sleeve 22 or, in an alternative embodiment, an additional outer sleeve or ring member defining the circumferential groove may be fitted onto sleeve member 22. This embodiment may be particularly useful in retrofitting the present invention to existing power tools and chucks. Referring again to the figures in general, rotary power tool 10 includes a casing 14 housing the rotational drive spindle 52. Casing 14 is also the housing member for the drive spindle motor (not illustrated).

The invention may be utilized with any manner of power tool, for example, a router. The router illustrated in the figures is a fixed base router and base 26 is axially advanceable relative to casing 14 by rotating base 26 relative to the casing. Upon rotation of the base 26, working surface 48 of base 26 is axially positioned to establish a working position of tool 24 held by chuck device 12 relative to a work piece. The operation of the base member is conventional and well known to those skilled in the art. In general, an operator adjusts the base member by releasing locking device 20 and rotating handle 38 causing the base member to move axially relative to casing 14.

In an alternative conventionally known plunge router, the base member moves axially on guide rods or arms without rotating relative to the router casing. The present invention is just as applicable to this type router.

The sleeve actuating device, generally 31, according to the invention is based on the principle of mechanical advantage wherein the movement of a first member 18 actuates chuck device 12. In this manner, remote chuck actuating device 31 is operably engaged between casing 14 and chuck device 12 wherein movement of an electrical device is transferred to chuck device 12 to move the chuck between the gripping and release positions. In the embodiment wherein remote chuck actuating device 31 is incorporated on a fixed base router, the sleeve actuating device is disposed between the rotatable base member 26 and chuck 12 so as not to interfere with rotational movement of the base member 26 on casing 14.

In the embodiment wherein chuck device 12 incorporates an axially movable outer sleeve 22, first member 18 is engaged with outer sleeve 22 for moving chuck device 12 between the gripping and release positions. First member 18 is connected to pivot point 34 by pivot pin 32. First member 18 is pivotally mounted to pivot point 34 so that when an axial force is applied to first member 18 at least one engaging arm 44 will move chuck device 12 between the gripping and release positions.

Figure 2:
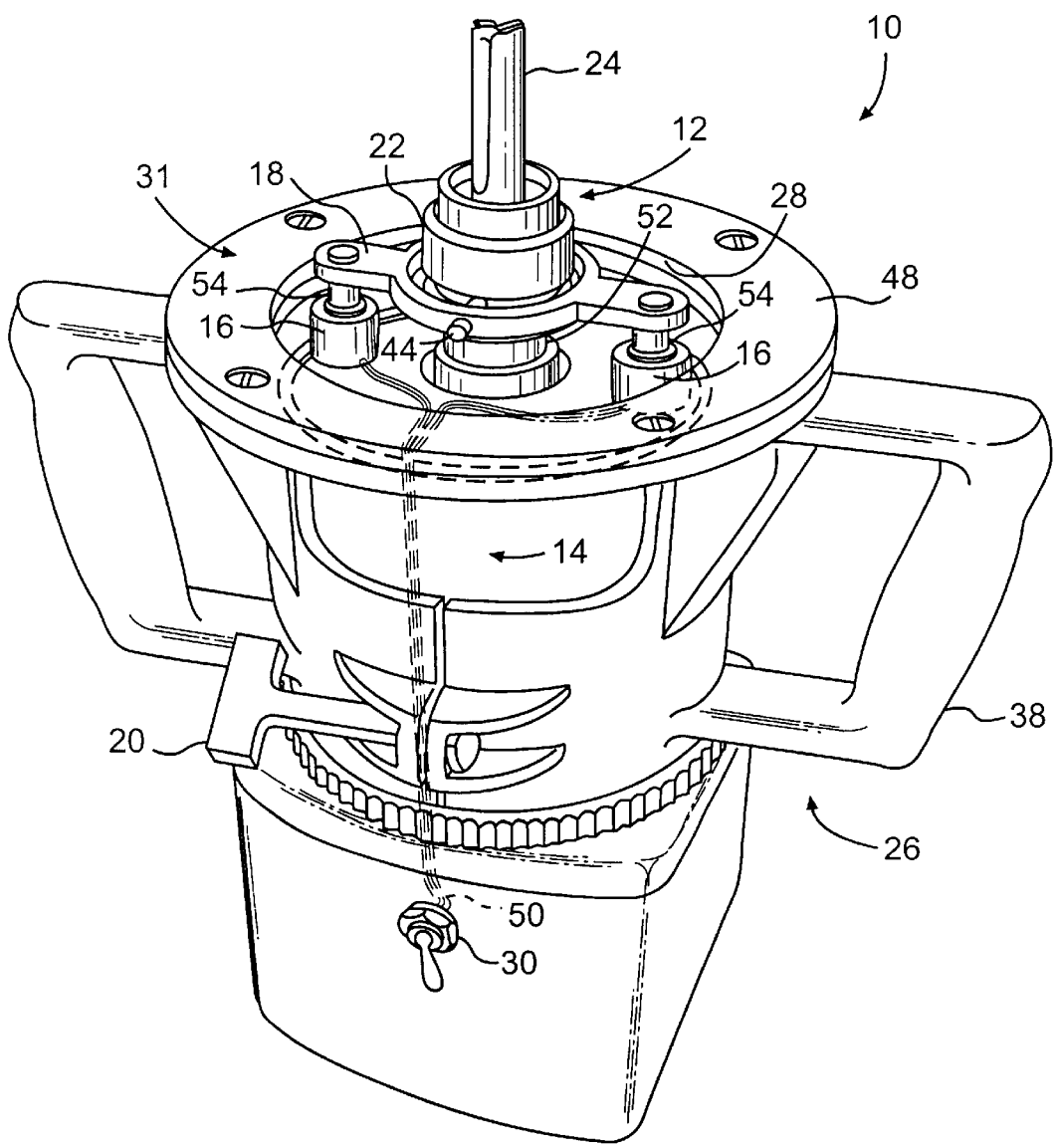
FIG. 2 is a perspective view of a router incorporating two solenoid sleeve actuating devices.

In the embodiments illustrated in FIGS. 1–4, first member 18 is attached to an actuator member, for example, a conventional solenoid 16 with a solenoid armature 54 at pin 36. Upon activation of solenoid 16, solenoid armature 54 will move axially as is commonly understood. Remote chuck actuating device 31 preferably should be constructed so as not to interfere with the operation of the movement of the base 26. As shown in FIGS. 1 and 2, remote chuck actuating device 31 is contained with the inner circumference 28 of base 26. This allows base 26 to be moved up and down without having to make any modifications to base 26.

To operate the device illustrated in FIGS. 1–4, bit 24 is inserted into chuck device 12 whereupon an operator operates solenoid device 16 causing solenoid armature 54 to move axially. Axial movement of solenoid armature 54 is transferred to first member 18 through pin 36. Pin 36 connecting first member 18 to solenoid armature 54 is adjustable within opening 57 of first member 18. Opening 57 accounts for the varying position of solenoid armature 54 relative to first member 18 as solenoid armature 54 moves from a first position shown in FIG. 3 to a second position shown in FIG. 4. As solenoid armature 54 moves from said first position to said second position, first member 18 is caused to pivotally rotate about pivot point 34. First member 18 is attached to pivot point 34 through pivot pin 32. Pivot point 34 is attached to casing 14. As first member 18 rotates about pin 32 at pivot point 34, engaging arm 44, which is seated in groove 42 created by shoulders 40, is moved axially relative to the axial movement of the first member 18. The axial movement of engaging arm 44 causes chuck sleeve 22 to move between a gripping and release position.

As shown in FIGS. 1 and 2, switch 30 is electrically connected to solenoid 16 through wires 50. By manipulating switch 30, the electrical system connecting the solenoid to the switch is activated, thus allowing the operation of the solenoid.

It should be appreciated by those skilled in the art that any number of electrical configurations may be utilized to supply power to the electric actuating device, including solenoid 16. One suitable configuration is illustrated in the schematic diagram of FIG. 5. It should be appreciated that FIG. 5 is provided for purposes of example only and is not meant as a limitation of the invention.

Figure 5:
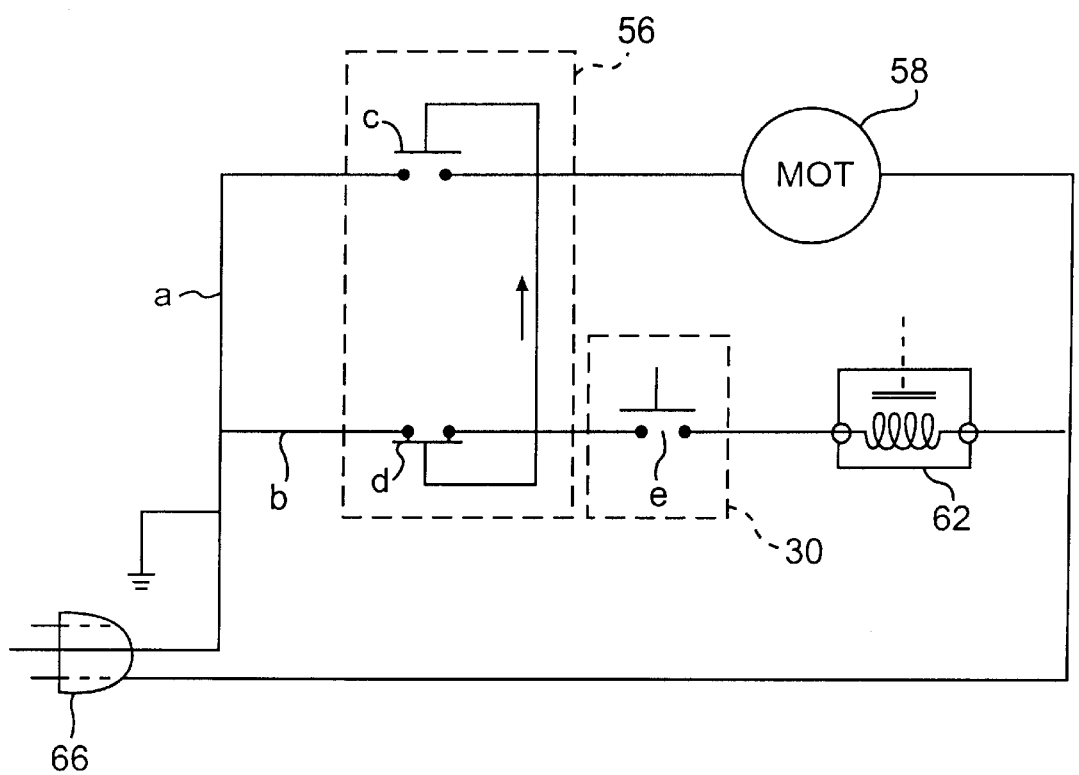
FIG. 5 is a schematic diagram electrically connecting a solenoid device to the electrical system.

Referring to FIG. 5, motor 58 is the main motor for rotary power tool 10. As is conventionally understood, A/C power is supplied to motor 58 through a conventional electric connection, represented as plug 66. A switch 56 is identified and can be, for example, the main on/off switch for rotary power tool 10. The diagram illustrates the rotary power tool in its "off" or de-energized state wherein contact C is open. In this state, contact D in supply line B is closed so that power can be supplied to solenoid 62 via a second switch 30. Thus, to supply power to solenoid 62 in order to move chuck device 12 to the release or open position, the operator merely activates or otherwise closes switch 30 so that power is supplied directly to solenoid 62. Preferably, switch 30 is spring-loaded so that contact E automatically opens upon release of switch 30. Thus, it is not possible to supply power to the main motor 58 and the solenoid 62 at the same time, for obvious safety considerations.

Once the tool bit has been inserted into the chuck device, the operator simply releases switch 30, which causes contact E to open, and then moves the main power switch 56 to the "on" position. In the "on" position, contact C is closed and contact D is open, wherein power is supplied only to the main motor 58.

Although not illustrated in the figures, it may also be desired to supply power to solenoid 62 from an alternate independent power source, for example, a separate D/C power source. This embodiment may be preferred in that in certain operations, it may be desired to actuate chuck device 12 without necessarily plugging the rotary power tool into an electric circuit. Although not illustrated in FIG. 5, the alternate independent power source, such as a portable replaceable battery incorporated with the power tool, could be incorporated directly into the schematic configuration of FIG. 5 such that it is easily connectable to solenoid 62 through, for example, an additional switch. It should be appreciated that a vast number of ways for supplying alternate power to solenoid 62 is within the skill of those in the art.

It should also be appreciated that a lever or other manual actuating device could be configured with member 18 to manually actuate the chuck device in the event of loss of power to the tool.

Figure 3:
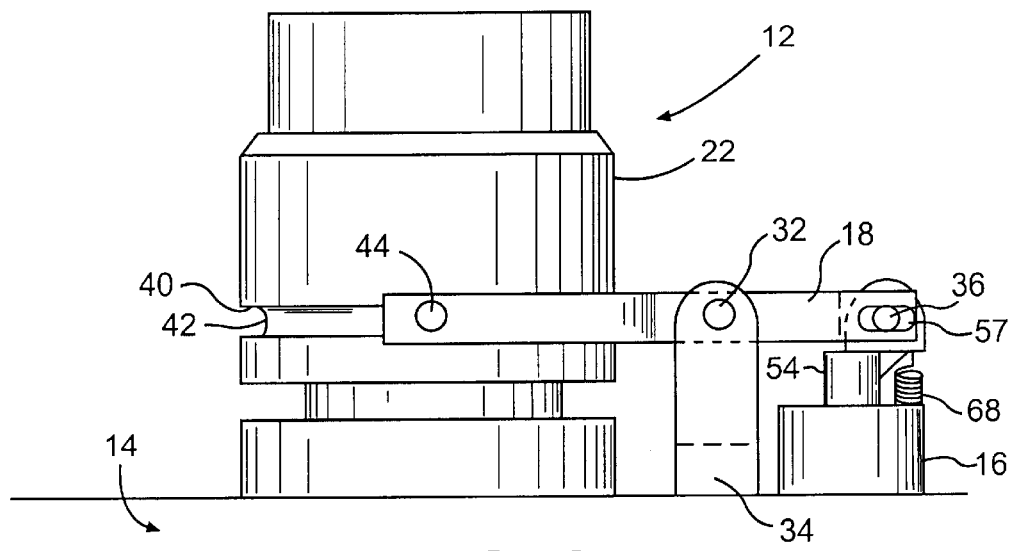
FIG. 3 is an elevational view of a chuck actuating device in a first position.
Figure 4:
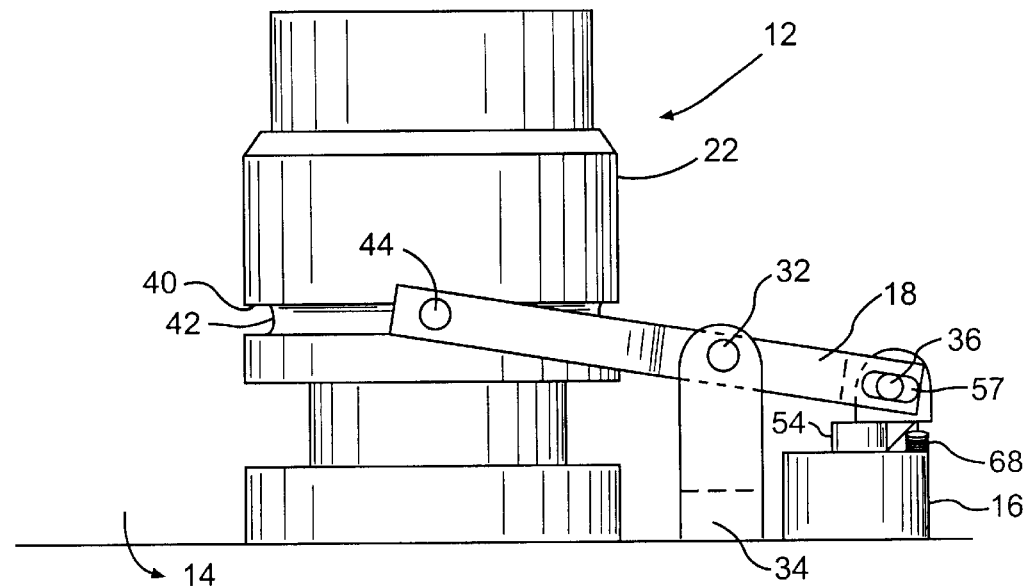
FIG. 4 is an elevational view of a chuck actuating device in a second position.

It should be appreciated that first member 18 is moved between a gripping and release position by at least one solenoid device 16. The solenoid device may take on numerous configurations to allow operation of the first member 18. One embodiment is depicted in FIG. 3. Spring 68 is operably connected between solenoid device 16 and first member 18. Spring 68 biases first member 18 to a first position shown in FIG. 3. When solenoid device 16 is activated, it acts against the force of the biasing mechanism, in this case spring 68, and moves sleeve 22 into a gripping or release position. Upon de-energizing the solenoid device, the biasing mechanism will move first member 18 back to a first position.

In another embodiment, solenoid device 54 may have a reverse winding to allow the solenoid device itself to move first member from a first position to a second position and back again. In such case, no biasing mechanism is necessary.

In another embodiment as depicted in FIG. 2, two solenoid devices 54 are positioned on opposite sides of first member 18. When the solenoids are activated, they work to move first member 18 and sleeve 22 into a second position. When they are inactivated, a biasing mechanism returns them to the first position.

As has been explained, the electrical device which activates the chuck can take on any number of configurations. The main purpose is to move the chuck device between a gripping and release position. Any and all such constructions are within the scope and spirit of the invention. It should be appreciated by those skilled in the art that various modifications and variations can be made in the present invention without varying from the scope and spirit of the invention. It is intended that the present invention include such modifications and variations as come within the scope of the appended claims and their equivalents.

What is claimed is:

1. A rotary power tool having a remotely actuated chuck device, said power tool comprising:

a rotationally driven drive spindle housed within a casing, said spindle having a longitudinal axis;

a chuck device attached to an end of said drive spindle, said chuck device movable between a gripping position wherein said chuck device clamps upon a tool held therein, and a release position wherein said chuck device releases a tool held therein; and an actuating device operably engaged with said chuck device to move said chuck device between said gripping and release positions, wherein said actuating device is electrically operated and is mounted on an upper surface of said casing radially displaced from said chuck device, and wherein said actuating device includes a member that is generally axially movable upon electric current being supplied to said actuating device, said actuating device including at least one solenoid device and a first member interconnecting said movable member to said chuck device.

2. The rotary power tool as in claim 1, wherein said at least one solenoid device includes at least one solenoid and at least one biasing mechanism, wherein said at least one biasing mechanism is operably connected to said at least one solenoid to return said chuck device to a predetermined position when said at least one solenoid is not activated.

3. The rotary power tool as in claim 2, wherein said at least one biasing mechanism includes a spring.

4. The rotary power tool as in claim 1, wherein said actuating device includes two solenoid devices, wherein a first solenoid moves said chuck device into a gripping position and wherein a second solenoid moves said chuck device into a release position.

5. The rotary power tool as in claim 1, wherein said chuck device includes an outer sleeve member that is axially movable between a gripping position wherein said chuck device clamps upon a tool held therein, and a release position wherein said chuck device releases a tool held therein.

6. The rotary power tool as in claim 5, wherein said first member is engaged with said outer sleeve member and extends generally radially outward from said chuck device, said first member movable in a direction so as to move said outer sleeve member between said gripping position and said release position, said actuating device configured with said first member to move said first member upon electrical actuation of said actuating device.

7. The rotary power tool as in claim 1, wherein said rotary power tool is a router.

8. The rotary power tool as in claim 1, wherein said chuck device includes a sleeve, said sleeve defining an outer circumferential surface of said chuck device, and wherein said movable member is radially displaced from said outer circumferential surface of said chuck device.

9. The rotary power tool as in claim 1, wherein said movable member does not rotate with said spindle when said spindle rotates with respect to said casing.

10. The rotary power tool as in claim 1, wherein said chuck device includes a sleeve, said sleeve defining an outer circumferential surface of said chuck device, and wherein said at least one solenoid is radially displaced from said outer circumferential surface of said chuck device, and wherein said at least one solenoid does not rotate with said spindle when said spindle rotates with respect to said casing.

11. The rotary power tool as in claim 1, wherein said first member pivots about a pivot pin.

12. The rotary power tool as in claim 11, wherein said pivot pin is disposed between said at least one solenoid and said chuck device.

13. A rotary power tool having a remotely actuated chuck device, said power tool comprising:

a rotationally driven drive spindle housed within a casing, said spindle having a longitudinal axis;

at least one handle attached to said casing;

a chuck device attached to an end of said drive spindle, said chuck device including an outer sleeve member that is axially movable between a gripping position wherein said chuck device clamps upon a tool held therein, and a release position wherein said chuck device releases a tool held therein;

a sleeve actuating device having a first member operably engaged with said outer sleeve member and extending generally radially outward from said chuck device, said first member movable in a direction so as to move said outer sleeve member between said gripping position and said release position, said sleeve actuating device including at least one solenoid mounted on an upper surface of said casing and operably connected to said first member so that upon activation of said at least one solenoid, axial movement of said at least one solenoid is imparted to said sleeve member via said first member to move said sleeve member between said release and gripping positions.

14. The rotary power tool as in claim 13, wherein said actuating device includes a joint mechanism operationally disposed between said at least one solenoid and said first member to convert movement of said solenoid to pivotal movement of said first member.

15. The rotary power tool as in claim 13, wherein said chuck device includes a sleeve, said sleeve defining an outer circumferential surface of said chuck device, and wherein said at least one solenoid is radially displaced from said outer circumferential surface of said chuck device, and wherein said at least one solenoid is fixed to said casing upper surface.

16. A rotary power tool having a remotely actuated chuck device, said power tool comprising:

a rotationally driven drive spindle housed within a casing, said spindle having a longitudinal axis, said casing including a generally planar upper surface that defines an outer boundary radially offset from said spindle;

a chuck device attached to an end of said drive spindle, said chuck device movable between a gripping position wherein said chuck device clamps upon a tool held therein, and a release position wherein said chuck device releases a tool held therein; and an actuating device disposed entirely within said upper surface outer boundary and operably engaged with said chuck device to move said chuck device between said gripping and release positions, wherein said actuating device is electrically operated and is mounted on said casing upper surface radially displaced from said chuck device, and wherein said actuating device includes a member that is generally axially movable upon electric current being supplied to said actuating device, said actuating device including at least one solenoid device and a first member interconnecting said movable member to said chuck device.

17. The rotary power tool as in claim 16, wherein said upper surface is generally perpendicular to said drive spindle.

18. The rotary power tool as in claim 16, wherein said casing includes an outer portion disposed below said casing upper surface.

19. The rotary power tool as in claim 18, wherein said casing outer portion is generally cylindrical and is correspondingly shaped to said upper surface outer boundary.

20. The rotary power tool as in claim 18, including at least one handle disposed on said outer portion.

21. The rotary power tool as in claim 16, wherein said at least one solenoid device includes at least one solenoid and at least one biasing mechanism, wherein said at least one biasing mechanism is operably connected to said at least one solenoid to return said chuck device to a predetermined position when said at least one solenoid is not activated, and wherein said at least one biasing mechanism includes a spring.

* * * * *